United States Patent
Wu (10) Patent No.: US 10,439,989 B2
(45) Date of Patent: Oct. 8, 2019

(54) DEVICE AND METHOD OF HANDLING CELLULAR NETWORK AND WIRELESS LOCAL AREA NETWORK RADIO LEVEL INTEGRATION WITH INTERNET PROTOCOL SECURITY TUNNEL

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 215 days.

(21) Appl. No.: 15/648,445

(22) Filed: Jul. 12, 2017

(65) Prior Publication Data

US 2018/0019970 A1 Jan. 18, 2018

Related U.S. Application Data

(60) Provisional application No. 62/361,517, filed on Jul. 13, 2016.

(51) Int. Cl.
| | |
|---|---|
| *H04B 7/00* | (2006.01) |
| *H04L 29/06* | (2006.01) |
| *H04L 29/12* | (2006.01) |
| *H04W 12/08* | (2009.01) |
| *H04W 76/12* | (2018.01) |
| *H04W 88/06* | (2009.01) |

(52) U.S. Cl.
CPC ........ *H04L 63/029* (2013.01); *H04L 61/2015* (2013.01); *H04L 63/0254* (2013.01); *H04L 63/164* (2013.01); *H04W 12/08* (2013.01); *H04W 76/12* (2018.02); *H04L 63/0236* (2013.01); *H04W 88/06* (2013.01)

(58) Field of Classification Search
CPC ......... H04W 72/0426; H04W 72/0493; H04W 72/1215
USPC .......................................... 370/310, 328, 329
See application file for complete search history.

(56) References Cited

U.S. PATENT DOCUMENTS

| | | | | |
|---|---|---|---|---|
| 8,588,793 | B2* | 11/2013 | Tomici | H04W 40/04 |
| | | | | 455/445 |
| 9,439,118 | B2* | 9/2016 | Zhao | H04W 36/14 |
| 9,854,500 | B2* | 12/2017 | Cho | H04W 40/12 |
| 10,091,160 | B2* | 10/2018 | Johnson | H04W 88/16 |
| 10,154,523 | B2* | 12/2018 | Wu | H04W 28/0236 |
| 10,172,027 | B2* | 1/2019 | Wu | H04W 76/16 |
| 10,219,310 | B2* | 2/2019 | Kanugovi | H04L 12/28 |
| 2016/0286438 | A1* | 9/2016 | Weingertner | H04W 36/0022 |

(Continued)

*Primary Examiner* — Dmitry Levitan
(74) *Attorney, Agent, or Firm* — Winston Hsu (57) ABSTRACT

A communication device of handling a CWIP comprises instructions of having a cellular connection with a base station (BS) of a cellular network; receiving a first Internet Protocol (IP) address from the BS via the cellular connection; receiving a CWIP configuration configuring a second IP address for establishing a first IPsec tunnel for the CWIP from the BS; having a WLAN connection with a WLAN, and receiving a third IP address for transmitting at least one IP packet via the WLAN, from the WLAN via the WLAN connection; establishing the first IPsec tunnel via the WLAN connection to the second IP address by using the third IP address; generating a first IP packet of the at least one IP packet and setting a source IP address of the first IP packet to the first IP address; and transmitting the first IP packet to the BS via the first IPsec tunnel.

18 Claims, 11 Drawing Sheets

(56) References Cited

U.S. PATENT DOCUMENTS

2017/0094701 A1* 3/2017 Hong ................. H04L 63/0272
2017/0156086 A1* 6/2017 Tomici ................. H04W 36/14

* cited by examiner

DEVICE AND METHOD OF HANDLING CELLULAR NETWORK AND WIRELESS LOCAL AREA NETWORK RADIO LEVEL INTEGRATION WITH INTERNET PROTOCOL SECURITY TUNNEL

CROSS REFERENCE TO RELATED APPLICATIONS

This application claims the benefits of U.S. Provisional Applications No. 62/361,517, filed on Jul. 13, 2016, which is incorporated herein by reference.

BACKGROUND OF THE INVENTION

1. Field of the Invention

The present invention relates to a communication device and a method used in a wireless communication system, and more particularly, to a communication device and method of handling a Cellular Network and Wireless Local Area Network Radio Level Integration with Internet Protocol Security Tunnel in a wireless communication system.

2. Description of the Prior Art

A user equipment (UE) may receive more than one IP addresses, when the UE is configured with a Cellular Network and Wireless Local Area Network (WLAN) Radio Level Integration with Internet Protocol Security (IPsec) Tunnel (CWIP). However, it is not clear how to communicate IP packets with a base station (BS) via the CWIP.

Thus, how to handle the CWIP is an important problem to be solved.

SUMMARY OF THE INVENTION

The present invention therefore provides a method and related communication device for handling a Cellular Network and Wireless Local Area Network (WLAN) Radio Level Integration with Internet Protocol Security (IPsec) Tunnel (CWIP) to solve the abovementioned problem.

A communication device of handling a Cellular Network and Wireless Local Area Network (WLAN) Radio Level Integration with Internet Protocol Security (IPsec) Tunnel (CWIP) comprises a storage device for storing instructions and a processing circuit coupled to the storage device. The processing circuit is configured to execute the instructions stored in the storage device. The instructions comprise having a cellular connection with a base station (BS) of a cellular network; receiving a first Internet Protocol (IP) address from the BS via the cellular connection; receiving a CWIP configuration configuring a second IP address for establishing a first IPsec tunnel for the CWIP from the BS; having a WLAN connection with a WLAN, and receiving a third IP address for transmitting at least one IP packet via the WLAN, from the WLAN via the WLAN connection; establishing the first IPsec tunnel via the WLAN connection to the second IP address by using the third IP address, when having the cellular connection; generating a first IP packet of the at least one IP packet and setting a source IP address of the first IP packet to the first IP address; and transmitting the first IP packet to the BS via the first IPsec tunnel, when having the cellular connection.

A method of handling a Cellular Network and Wireless Local Area Network (WLAN) Radio Level Integration with Internet Protocol Security (IPsec) Tunnel (CWIP) for a communication device. The method comprises having a cellular connection with a base station (BS) of a cellular network; receiving a first Internet Protocol (IP) address from the BS via the cellular connection; receiving a CWIP configuration configuring a second IP address for establishing a first IPsec tunnel for the CWIP from the BS; having a WLAN connection with a WLAN, and receiving a third IP address for transmitting at least one IP packet via the WLAN, from the WLAN via the WLAN connection; establishing the first IPsec tunnel via the WLAN connection to the second IP address by using the third IP address, when having the cellular connection; generating a first IP packet of the at least one IP packet and setting a source IP address of the first IP packet to the first IP address; and transmitting the first IP packet to the BS via the first IPsec tunnel, when having the cellular connection.

DETAILED DESCRIPTION

Figure 1:
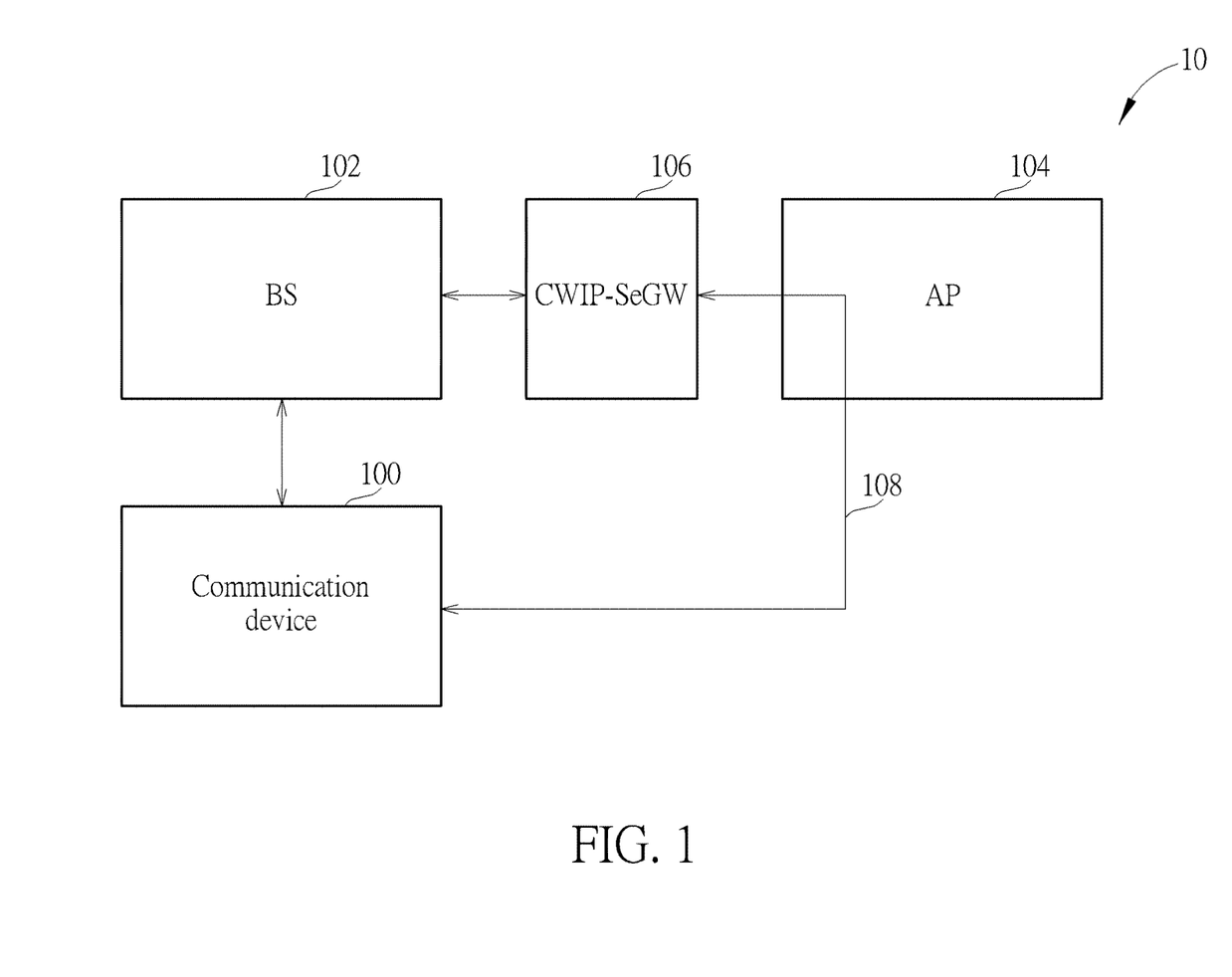
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and an access point (AP) 104. In FIG. 1, the communication device 100, the BS 102 and AP 104 are simply utilized for illustrating the structure of the wireless communication system 10. Practically, the BS 102 may be an evolved Node-B (eNB) or a fifth generation (5G) BS in a cellular network (e.g., a Long Term Evolution (LTE) system or a new radio (NR) system (or called 5G system)). The AP 104 may be a network entity in a wireless local area network (WLAN). The communication device 100 and the AP 104 may support Institute of Electrical and Electronics Engineers (IEEE) 802.11 related standards (e.g., IEEE 802.11a/b/g/n/ac/ad/ax).

In detail, the cellular network may be aggregated with the WLAN to improve throughput of the cellular network or offload traffic to the WLAN from the cellular network, which may be a Cellular Network and WLAN Radio Level Integration with Internet Protocol Security Tunnel (CWIP). That is, the BS 102 transmits/receives data via a cellular connection and a WLAN connection to/from the communication device 100. The BS 102 may or may not be collocated with the WLAN. The CWIP allows the communication device 100 in a connected mode to be configured by the BS 102 to utilize WLAN radio resources via Internet Protocol (IP) Security (IPsec) tunnelling. In FIG. 1, data (e.g., IP packet(s)) transmitted between the communication device 100 and a CWIP-Security Gateway (SeGW) 106 is encapsulated by using a CWIP tunnel 108 in order to provide security to the data transmitted via the WLAN. The CWIP-SeGW 106 may be collocated or non-collocated with the BS 102 or AP 104.

The communication device 100 may be a user equipment (UE), a mobile phone, a laptop, a tablet computer, an electronic book, a portable computer system, a vehicle or an aircraft. In addition, for an uplink (UL), the communication device 100 is a transmitter and the BS 102 and AP 104 are receivers, and for a downlink (DL), the BS 102 and AP 104 are transmitters and the communication device 100 is a receiver.

Figure 2:
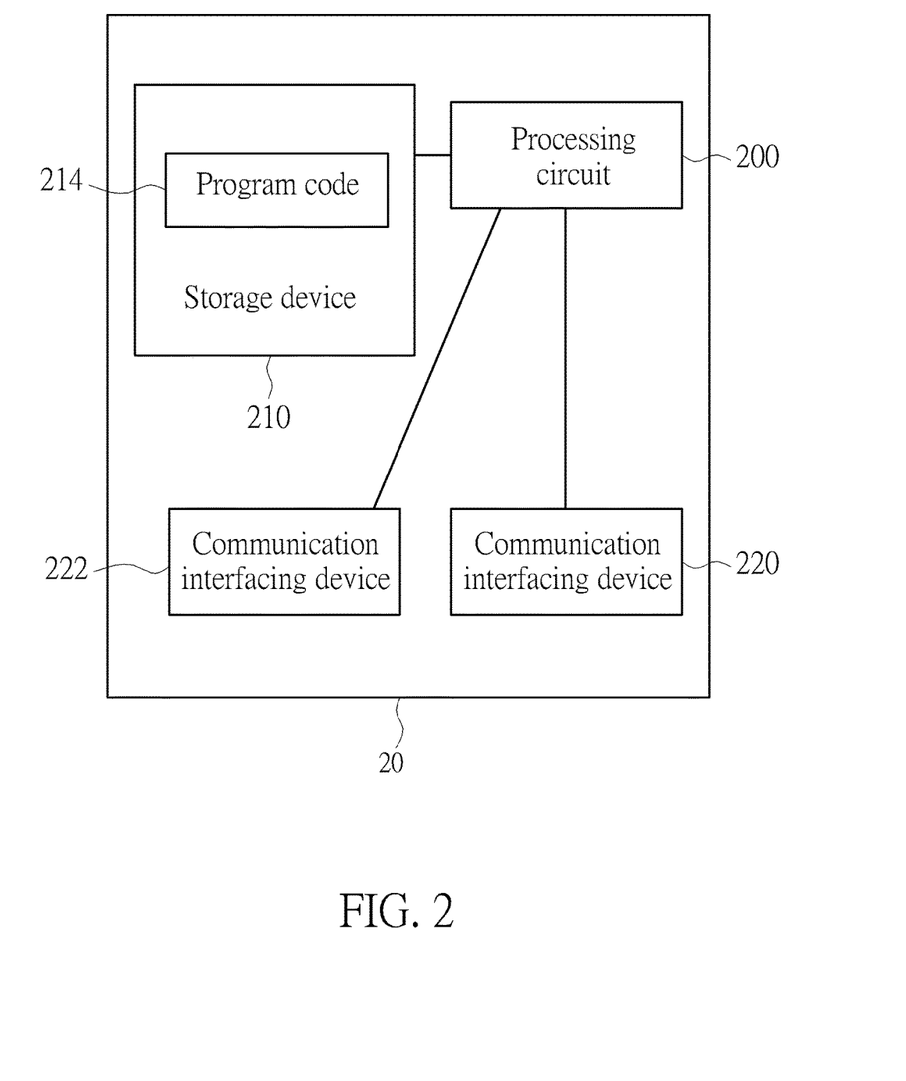
FIG. 2 is a schematic diagram of a communication device according to an example of the present invention.

FIG. 2 is a schematic diagram of a communication device 20 according to an example of the present invention. The communication device 20 may be the communication device 100, the BS 102 or the AP 104 shown in FIG. 1, but is not limited herein. The communication device 20 may include a processing circuit 200 such as a microprocessor or Application Specific Integrated Circuit (ASIC), a storage device 210, a communication interfacing device 220 for cellular network transmission/reception (e.g., protocol data units (PDUs)), and a communication interfacing device 222 for WLAN (e.g., WiFi) transmission/reception (e.g., PDUs or internet protocol (IP) packets). The storage device 210 may be any data storage device that may store a program code 214, accessed and executed by the processing circuit 200. Examples of the storage device 210 include but are not limited to a read-only memory (ROM), flash memory, random-access memory (RAM), hard disk, optical data storage device, non-volatile storage device, non-transitory computer-readable medium (e.g., tangible media), etc. The communication interfacing devices 220 and 222 include transceivers to transmit and receive signals (e.g., data, messages and/or packets) according to processing results of the processing circuit 200.

In the following examples, a UE is used for representing the communication device 100 in FIG. 1, a BS is used for representing the BS 102 and a WLAN or a WLAN AP is used for representing the AP 104 in FIG. 1, to simplify the illustration of the examples.

Figure 3:
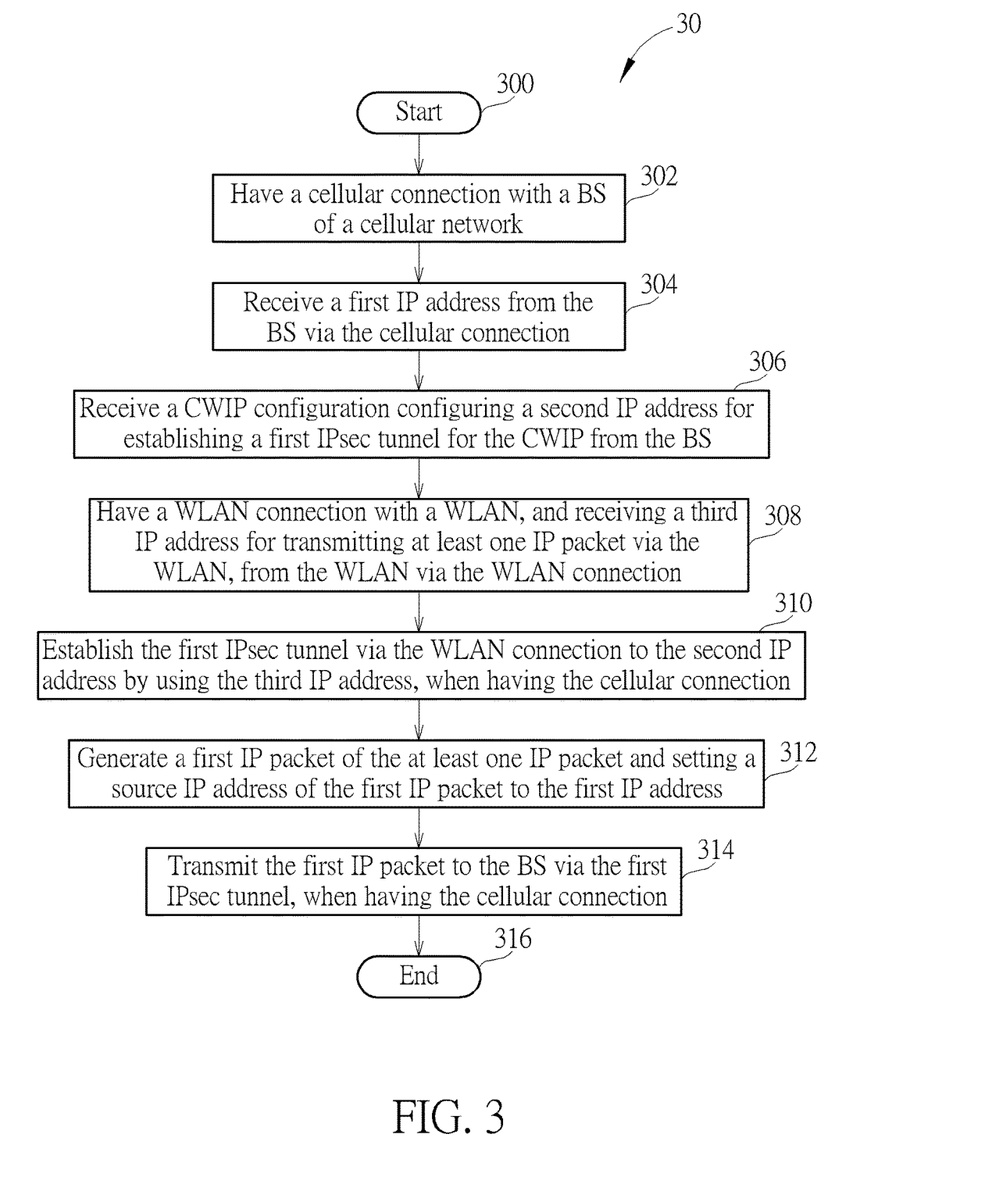
FIG. 3 is a flowchart of a process according to an example of the present invention.

FIG. 3 is a flowchart of a process 30 according to an example of the present invention. The process 30 is utilized in a UE, to handle a CWIP. The process 30 includes the following steps:

Step 300: Start.

Step 302: Have a cellular connection with a BS of a cellular network.

Step 304: Receive a first IP address from the BS via the cellular connection.

Step 306: Receive a CWIP configuration configuring a second IP address for establishing a first IPsec tunnel for the CWIP from the BS.

Step 308: Have a WLAN connection with a WLAN, and receiving a third IP address for transmitting at least one IP packet via the WLAN, from the WLAN via the WLAN connection.

Step 310: Establish the first IPsec tunnel via the WLAN connection to the second IP address by using the third IP address, when having the cellular connection.

Step 312: Generate a first IP packet of the at least one IP packet and setting a source IP address of the first IP packet to the first IP address.

Step 314: Transmit the first IP packet to the BS via the first IPsec tunnel, when having the cellular connection.

Step 316: End.

According to the process 30, the UE knows how to set the IP addresses to the first packet, when transmitting the first packet via the CWIP. Thus, the problem of communicating IP packets with the BS via the WLAN is solved.

Realization of the process 30 is not limited to the above description. The following examples may be applied for realizing the process 30.

In one example of transmitting the first IP packet to the BS via the first IPsec tunnel, the UE encapsulates the first IP packet to a second IP packet. The UE sets a source IP address (e.g., in an IP header) of the second IP packet to the third IP address, and sets a destination IP address (e.g., in an IP header) of the second IP packet to the second IP address. The second IP address is a CWIP-SeGW IP address.

Figure 4:
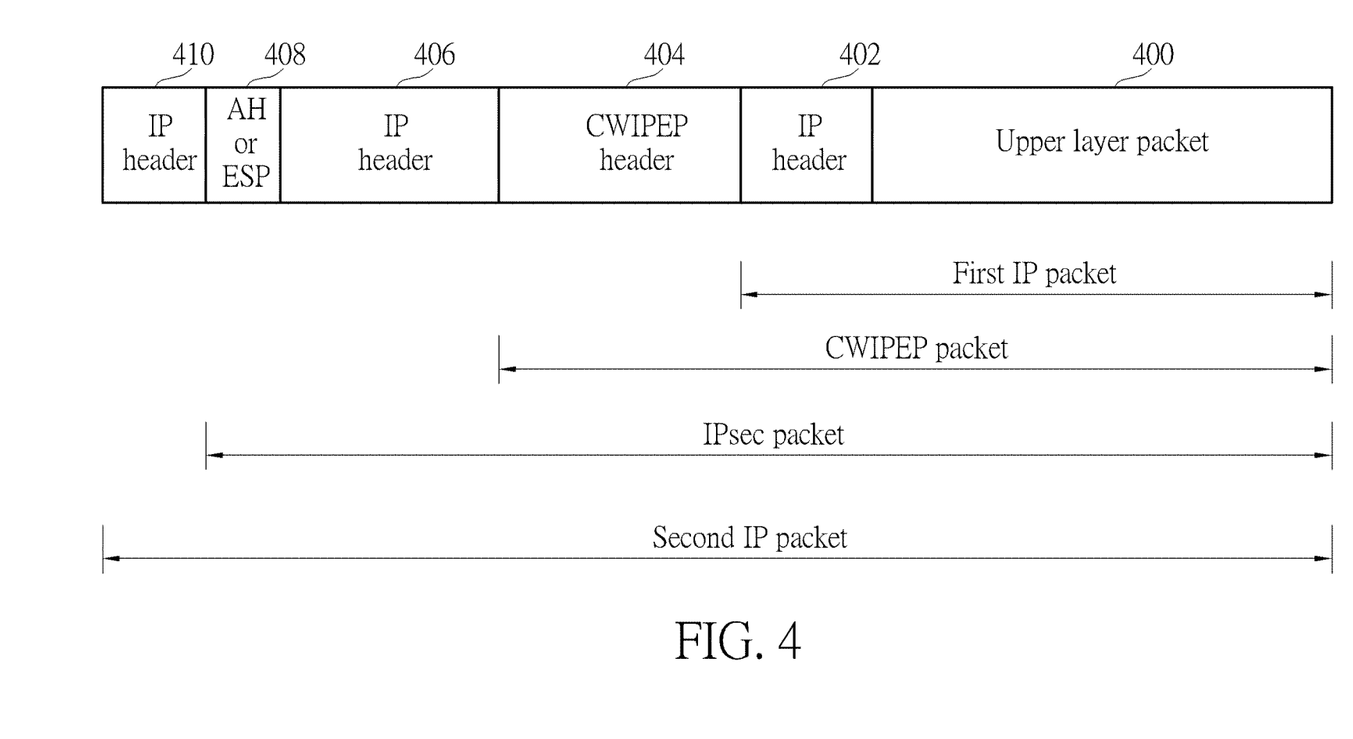
FIG. 4 is a schematic diagram of an encapsulation of a first IP packet to a second IP packet according to an example of the present invention.

FIG. 4 is a schematic diagram of an encapsulation of the first IP packet to the second IP packet according to an example of the present invention. In FIG. 4, the first IP packet includes an upper layer (e.g., Transmission Control Protocol (TCP) or User Datagram Protocol (UDP)) packet 400 and an IP header 402, and the IP header of the first packet (i.e., IP header 402) is set to the first IP address. A CWIP encapsulation (CWIPEP) packet includes the first IP packet and a CWIPEP header 404. An IPsec packet includes the CWIPEP packet and an IP header 406. A source IP address of the IP header 406 is set to the third IP address, and a destination IP address of the IP header 406 is set to the second IP address. The IPsec packet may include an authentication header (AH) 408 or an encapsulating security payload (ESP) 408. The second IP packet includes the IPsec packet and an IP header 410. A source IP address of the IP header 410 is set to the third IP address, and a destination IP address of the IP header 410 is set to the second IP address.

In one example, the cellular connection includes that the UE has a cell radio network temporary identifier (C-RNTI) configured by the BS for communicating with the BS. In one example, the cellular connection includes a radio resource control (RRC) connection and may or may not include a data radio bearer (DRB). The UE may receive the first IP address from the cellular network (e.g., a Mobility Management Entity (MME)) via the RRC connection in a Non-Access-Stratum (NAS) message (e.g., an "ACTIVATE DEFAULT EPS BEARER CONTEXT REQUEST" message transmitted by the MME in response to a Packet Data Network (PDN) connectivity request message transmitted by the UE to request for establishing a PDN connection) or via the DRB (e.g., in a Dynamic Host Configuration Protocol (DHCP) message). The UE may receive a RRC message including a CWIP configuration from the BS via the cellular connection. The UE may perform an association procedure to connect to the WLAN configured by the CWIP configuration. The UE may initiate an establishment of the first IPsec tunnel.

In addition to the second IP address, the CWIP configuration may include a WLAN identity (e.g., Service Set Identifier (SSID), Basic Service Set Identifier (BSSID), or Homogenous Extended Service Set Identifier (HESSID)) of the WLAN, an initial identity value used by the UE in an Internet Key Exchange Protocol Version 2 (IKEv2) handshake and/or a CWIP counter. The UE may derive a pre-shared key according to (e.g., using) the CWIP counter, and apply the pre-shared key to the establishment of the first IPsec tunnel.

In one example, the UE has an application processor for running a higher layer operating system (OS) (e.g., Android, Windows or iOS), a cellular modem processor and a WLAN (e.g., WiFi) modem processor. When the cellular modem processor receives the CWIP configuration, the cellular modem processor may forward the CWIP configuration to the application processor. Various realizations of the process 30 are described in processes 40 and 50.

Figure 5:
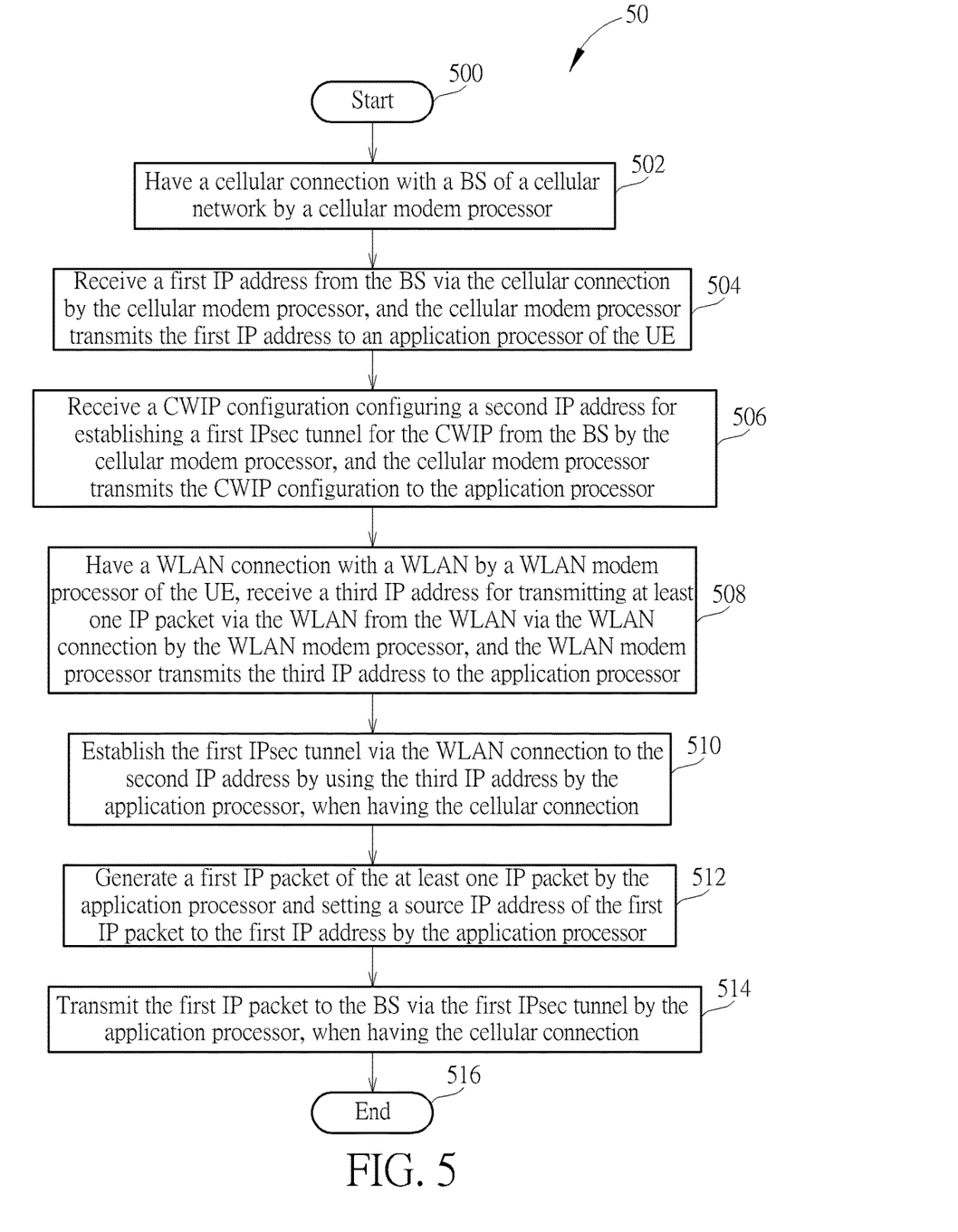
FIG. 5 is a flowchart of a process according to an example of the present invention.

FIG. 5 is a flowchart of a process 50 according to an example of the present invention. The process 50 is utilized in a UE, to handle a CWIP. The process 50 includes the following steps:

Step 500: Start.

Step 502: Have a cellular connection with a BS of a cellular network by a cellular modem processor.

Step 504: Receive a first IP address from the BS via the cellular connection by the cellular modem processor, and the cellular modem processor transmits the first IP address to an application processor of the UE.

Step 506: Receive a CWIP configuration configuring a second IP address for establishing a first IPsec tunnel for the CWIP from the BS by the cellular modem processor, and the cellular modem processor transmits the CWIP configuration to the application processor.

Step 508: Have a WLAN connection with a WLAN by a WLAN modem processor of the UE, receive a third IP address for transmitting at least one IP packet via the WLAN from the WLAN via the WLAN connection by the WLAN modem processor, and the WLAN modem processor transmits the third IP address to the application processor.

Step 510: Establish the first IPsec tunnel via the WLAN connection to the second IP address by using the third IP address by the application processor, when having the cellular connection.

Step 512: Generate a first IP packet of the at least one IP packet by the application processor and setting a source IP address of the first IP packet to the first IP address by the application processor.

Step 514: Transmit the first IP packet to the BS via the first IPsec tunnel by the application processor, when having the cellular connection.

Step 516: End.

According to the process 50, the cellular modem processor transmits the second IP address to the application processor, and the application processor initiates an establishment of the first IPsec tunnel. The application processor generates the first IP packet. For transmitting the first IP packet via the first IPsec tunnel, the application processor may generate a CWIPEP packet including the first IP packet, and generates an IPsec packet including the CWIPEP packet. The application processor generates the second IP packet including the IPsec packet, and transmits the second IP packet to the CWIP-SeGW via the WLAN by the WLAN (e.g., WiFi) modem processor. A source IP address of a header of the second IP packet (e.g., IP header 410 in FIG. 4) is set to the third IP address, and a destination IP address of the header of the second IP packet is set to the second IP address. A source IP address in an IP header of the IPsec packet (e.g., IP header 406 in FIG. 4) is set to the third IP address, and a destination IP address in the IP header of the IPsec packet is set to the second IP address.

Figure 6:
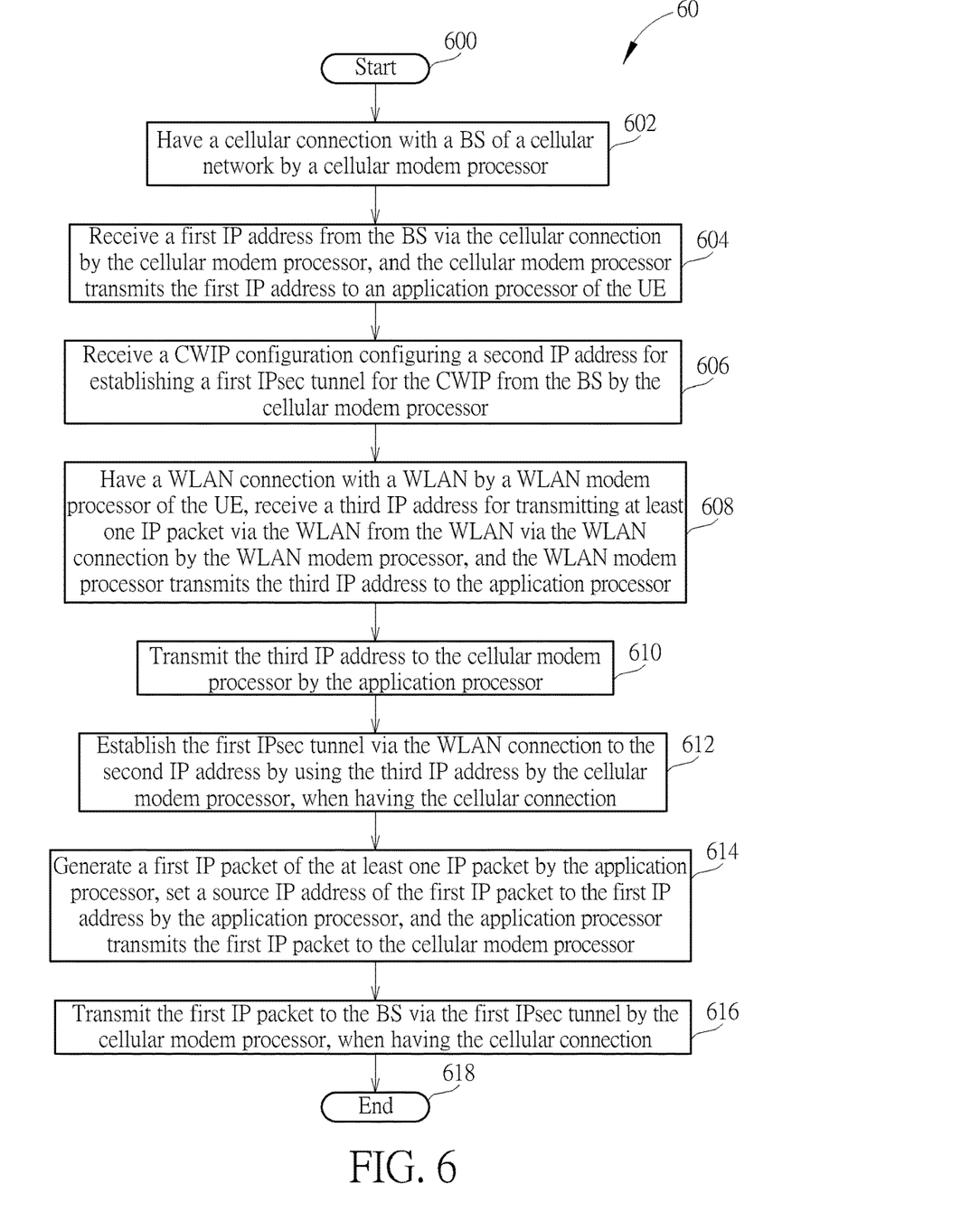
FIG. 6 is a flowchart of a process according to an example of the present invention.

FIG. 6 is a flowchart of a process 60 according to an example of the present invention. The process 60 is utilized in a UE, to handle a CWIP. The process 60 includes the following steps:

Step 600: Start.

Step 602: Have a cellular connection with a BS of a cellular network by a cellular modem processor.

Step 604: Receive a first IP address from the BS via the cellular connection by the cellular modem processor, and the cellular modem processor transmits the first IP address to an application processor of the UE.

Step 606: Receive a CWIP configuration configuring a second IP address for establishing a first IPsec tunnel for the CWIP from the BS by the cellular modem processor.

Step 608: Have a WLAN connection with a WLAN by a WLAN modem processor of the UE, receive a third IP address for transmitting at least one IP packet via the WLAN from the WLAN via the WLAN connection by the WLAN modem processor, and the WLAN modem processor transmits the third IP address to the application processor.

Step 610: Transmit the third IP address to the cellular modem processor by the application processor Step 612: Establish the first IPsec tunnel via the WLAN connection to the second IP address by using the third IP address by the cellular modem processor, when having the cellular connection.

Step 614: Generate a first IP packet of the at least one IP packet by the application processor, set a source IP address of the first IP packet to the first IP address by the application processor, and the application processor transmits the first IP packet to the cellular modem processor.

Step 616: Transmit the first IP packet to the BS via the first IPsec tunnel by the cellular modem processor, when having the cellular connection.

Step 618: End.

In the step 616, the cellular modem processor transmits the first IP packet to the BS via the first IPsec tunnel, via a direct link between the cellular modem processor and the WLAN modem processor or via the application processor. For transmitting the first IP packet via the first IPsec tunnel, the cellular modem may generate a CWIPEP packet including the first IP packet, and generates an IPsec packet including the CWIPEP packet. In one example, the cellular modem generates the second IP packet including the IPsec packet, and transmits the second IP packet to the CWIP-SeGW via the direct link by the WLAN (e.g., WiFi) modem processor. In another example, the cellular modem processor transmits the IPsec packet to the application processor, and the application processor generates the second IP packet including the IPsec packet and transmits the second IP packet by the WLAN modem processor to the CWIP-SeGW.

A source IP address of a header of the second IP packet (e.g., IP header 410 in FIG. 4) is set to the third IP address, and a destination IP address of the header of the second IP packet is set to the second IP address. A source IP address in an IP header of the IPsec packet (e.g., IP header 406 in FIG. 4) is set to the third IP address, and a destination IP address in the IP header of the IPsec packet is set to the second IP address.

In one example, the UE initiates an IP Multimedia Subsystem (IMS) signaling (e.g., IMS call or IMS registration) via the WLAN (e.g., Voice over WiFi (VoWiFi), Video over WiFi (ViWifi)). The UE may not use the first IPsec tunnel for the IMS signaling. Instead, the UE initiates an establishment of a second IPsec tunnel to a fourth IP address of an Evolved Packet Data Gateway (ePDG) using the third IP address for the IMS signaling, while the UE has the first IPsec tunnel.

When the UE needs to transmit a second IP packet via the WLAN, the UE routes the second IP packet to the first IPsec tunnel when the second IP packet includes neither an IMS signaling packet (e.g., the IP packet includes a Session Initiation Protocol (SIP) message) nor a IMS voice (or video) packet (e.g., RTP packet). The UE routes the second IP packet to the second IPsec tunnel when the second IP packet includes the IMS signaling packet or the IMS voice (or video) packet. That is, the UE has a routing function (e.g., rule) for routing IP packets to the first IPsec tunnel or the second IPsec tunnel. In other words, the UE knows how to simultaneously perform the IMS signaling via the WLAN and the CWIP. The IMS signaling packet and the IMS voice (or video) packet may be generated by the cellular modem processor or the application processor. The second IPsec tunnel may be established by the cellular modem processor or the application processor.

Figure 7:
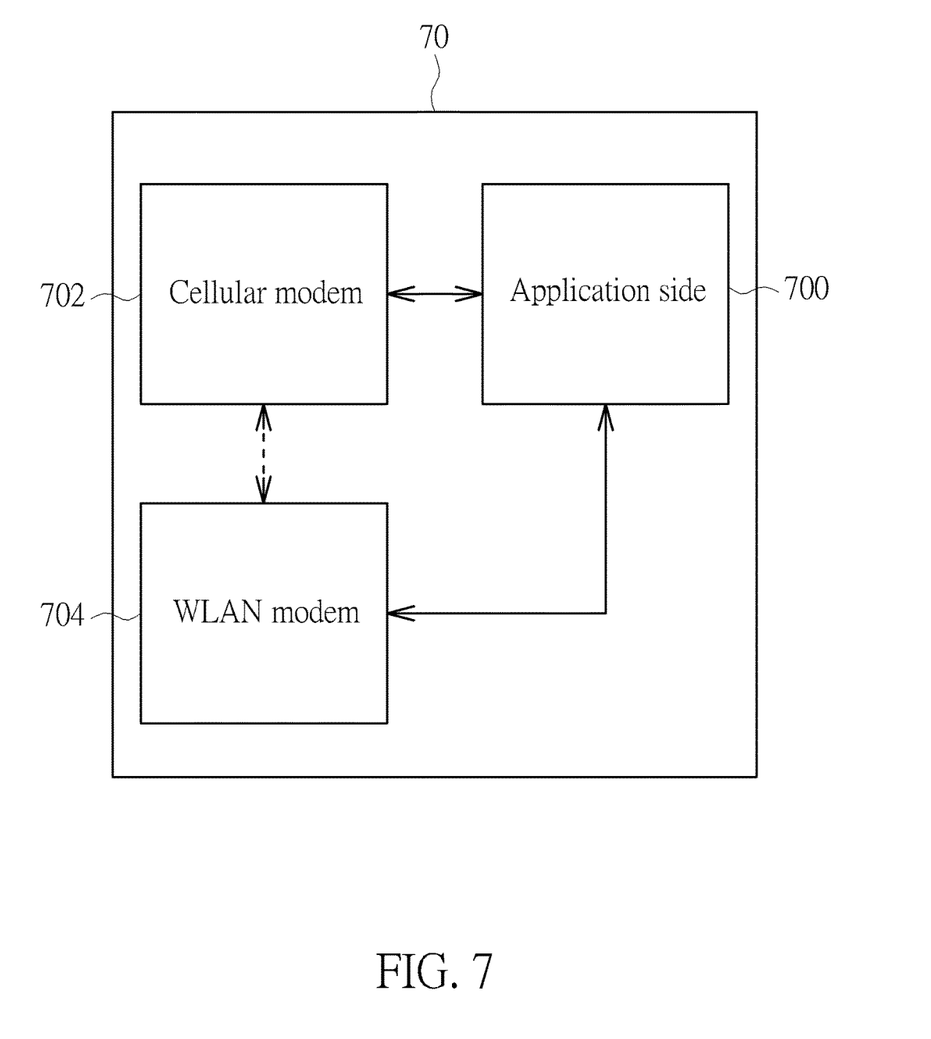
FIG. 7 is a schematic diagram of a UE according to an example of the present invention.

FIG. 7 is a schematic diagram of a UE 70 (e.g., the communication device 100 in FIG. 1) according to an example of the present invention. The UE 70 includes an application side 700, a cellular modem 702 including a cellular modem processor and a WLAN (e.g., WiFi) modem 704 including a WLAN modem processor. In FIG. 7, there is a physical connection (i.e., bidirectional arrow) between the application side 700 and the cellular modem 702, and there is a physical connection between the application side 700 and the WLAN modem 704. That is, the application side 700 communicates with the cellular modem 702 and the WLAN modem 704. In one example, there is a physical connection (i.e., direct link) between the cellular modem 702 and the WLAN modem 704. Thus, the cellular modem 702 and the WLAN modem 704 may communicate with each other directly (i.e., via the dotted line in FIG. 7). In another example, there is no physical connection between the cellular modem 702 and the WLAN modem 704. That is, the cellular modem 702 and the WLAN modem 704 communicate with each other indirectly (i.e., via the application side 700). In FIG. 7, examples of the physical connection between any two of the application side 700, cellular modem 702 and WLAN modem 704 may be any physical interface, e.g., peripheral component interconnect (PCI) express, shared memory, Universal Serial Bus (USB), General-purpose input/output (GPIO), Universal Asynchronous Receiver/Transmitter (UART), etc.

Figure 8:
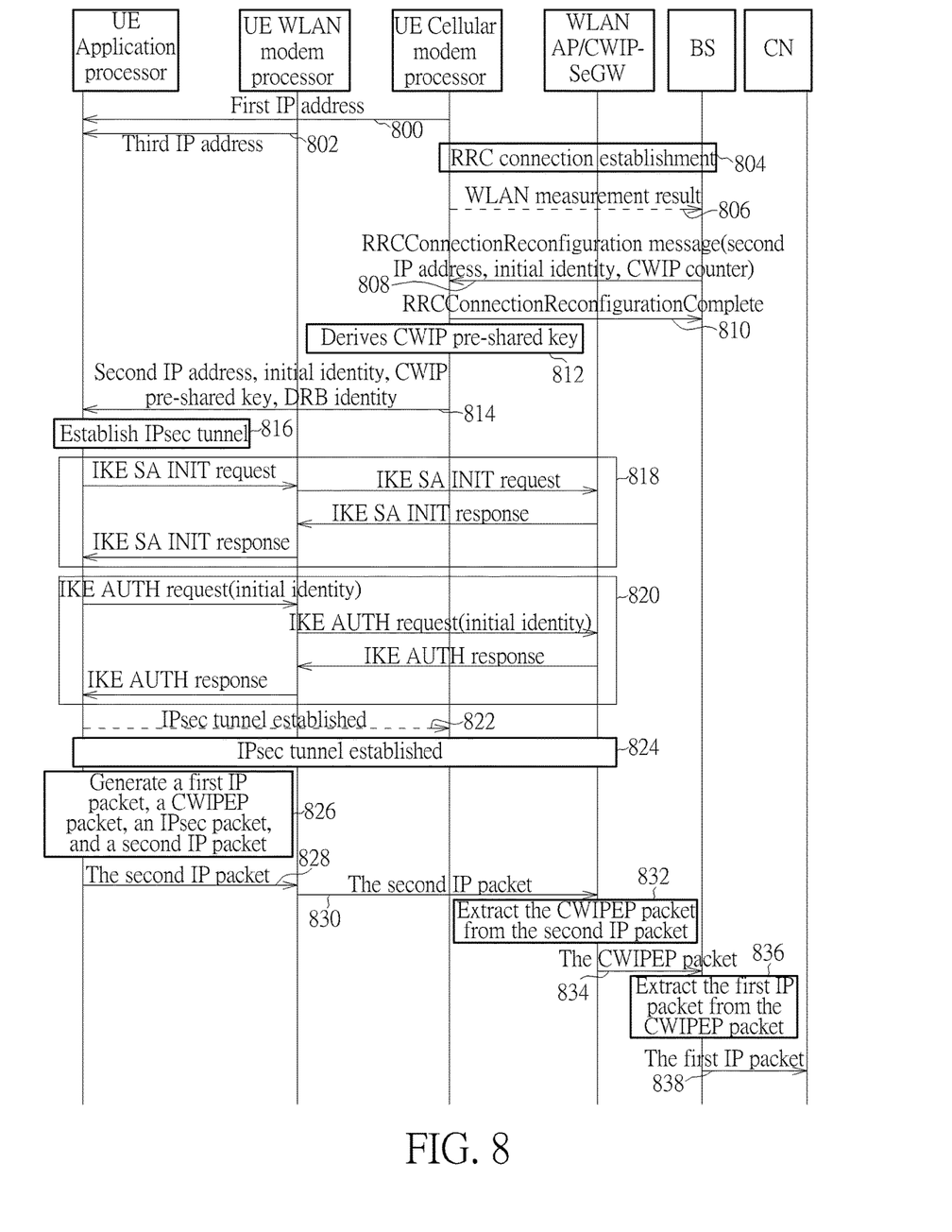
FIG. 8 is a flow diagram of an establishment of an IPsec tunnel for a CWIP according to an example of the present invention.

FIG. 8 is a flow diagram of an establishment of an IPsec tunnel for a CWIP according to an example of the present invention. In step 800, a cellular modem processor of a UE transmits a first IP address to an application processor of the UE. In step 802, a WLAN modem processor of the UE transmits a third IP address (e.g., in a "DHCP ACKNOWL-EDGE" message) to the application processor. In step 804, the cellular modem processor performs a RRC connection establishment with a BS. In step 806, the cellular modem processor may or may not transmit a WLAN measurement result to the BS. In step 808, the cellular modem processor receives a RRCConnectionReconfiguration message (i.e., including a CWIP configuration) including a second IP address, an initial identity and a CWIP counter from the BS. In step 810, the cellular modem processor transmits a RRCConnectionReconfigurationComplete message to the BS. In step 812, the cellular modem processor derives a CWIP pre-shared key. In step 814, the cellular modem processor transmits the second IP address, the initial identity, the CWIP pre-shared key and a DRB identity to the application processor. In step 816, the application processor initiates establishing the IPsec tunnel by using the second IP address, the initial identity, the CWIP pre-shared key. In step 818, an IKE security association (SA) INIT procedure is performed between the application processor, the WLAN modem processor and a CWIP-SeGW. In detail, the application processor transmits an IKE SA INIT request message via the WLAN modem processor to a CWIP-SeGW via a WLAN AP. The CWIP-SeGW transmits an IKE SA INIT response to the application processor via the WLAN modem processor. In step 820, an IKE authentic procedure is performed between the application processor, the WLAN modem processor and the CWIP-SeGW. In detail, the application processor transmits an IKE AUTH request with the initial identity via the WLAN modem processor to the CWIP-SeGW via the WLAN AP. The CWIP-SeGW transmits an IKE AUTH response to the WLAN modem processor. The WLAN modem processor transmits the IKE AUTH response to the application processor. In step 822, the application processor may or may not indicate that the IPsec tunnel is established to the cellular modem processor. In step 824, the IPsec tunnel is established between the UE and the CWIP-SeGW via the WLAN AP. In step 826, the application processor generates a first IP packet, generates a CWIPEP packet including the first IP packet, generates an IPsec packet including the CWIPEP packet, and generates the second IP packet including the IPsec packet (e.g., PDU). In step 828, the application processor transmits the second IP packet to the WLAN modem processor. In step 830, the WLAN modem processor transmits the second IP packet to the CWIP-SeGW via the WLAN AP. In step 832, the CWIP-SeGW extracts the CWIPEP packet from the second IP packet. In step 834, the CWIP-SeGW transmits the CWIPEP packet to the BS. In step 836, the BS extracts the first IP packet from the CWIPEP packet. In step 838, the BS transmits the first IP packet to a core network (CN) (e.g. serving gateway).

Figure 9:
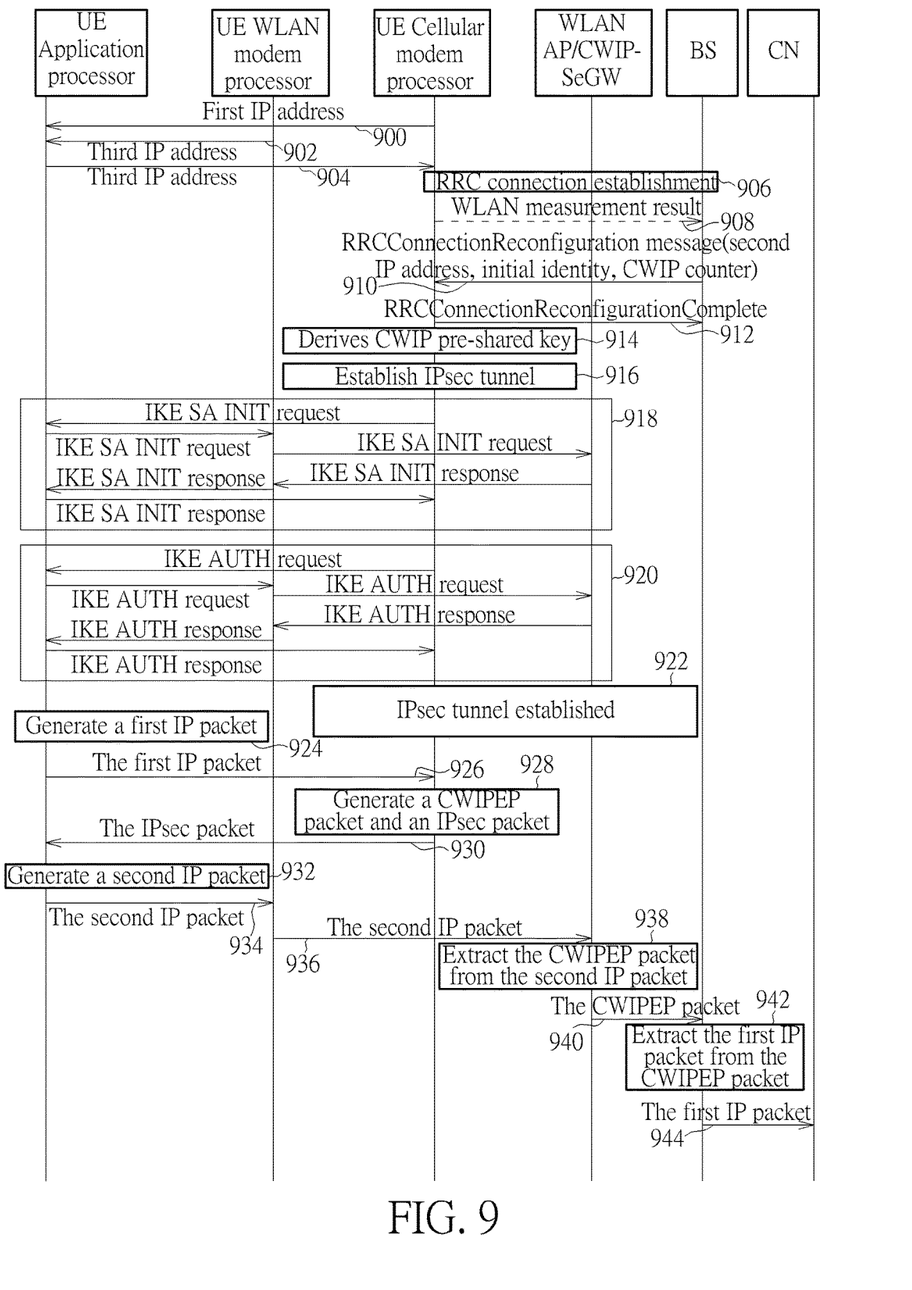
FIG. 9 is a flow diagram of an establishment of an IPsec tunnel for a CWIP according to an example of the present invention.

FIG. 9 is a flow diagram of an establishment of an IPsec tunnel for a CWIP according to an example of the present invention. Steps 900-902 are same as steps 800-802. In step 904, the application processor transmits the third IP address to the cellular modem processor. Alternatively, steps 902 and 904 may be replaced by a step that the WLAN modem processor directly transmits the third IP address to the cellular modem processor. Steps 906-914 are the same as steps 804-812. In step 916, the cellular modem processor initiates establishing the IPsec tunnel by using the second IP address, the initial identity and the CWIP pre-shared key. In step 918, an IKE SA INIT procedure is performed between the application processor, the WLAN modem processor, the cellular modem processor and the CWIP-SeGW. In detail, the cellular modem processor transmits an IKE SA INIT request via the application processor and the WLAN modem processor to the CWIP-SeGW via the WLAN AP. The CWIP-SeGW responds an IKE SA INIT response to the WLAN modem processor. Then the WLAN modem processor transmits the IKE SA INIT response to the cellular modem processor via the application processor. In step 920, an IKE authentic procedure is performed between the application processor, the WLAN modem processor, the cellular modem processor and the CWIP-SeGW. In detail, the cellular modem processor transmits an IKE AUTH request via the application processor and the WLAN modem processor to the CWIP-SeGW via the WLAN AP. The CWIP-SeGW transmits an IKE AUTH response to the WLAN modem processor. Then the WLAN modem processor transmits the IKE AUTH response to the cellular modem processor via the application processor. In step 922, the IPsec tunnel is established between the cellular mode processor and the CWIP-SeGW via the WLAN AP. In step 924, the application processor generates a first IP packet. In step 926, the application processor transmits the first IP packet to the cellular modem processor. In step 928, the cellular modem processor generates a CWIPEP packet including the first IP packet, and generates an IPsec packet including the CWIPEP packet. In step 930, the cellular modem processor transmits the IPsec packet to the application processor. In step 932, the application processor generates a second IP packet including the IPsec packet Steps 934-944 are same as steps 828-838.

Figure 10:
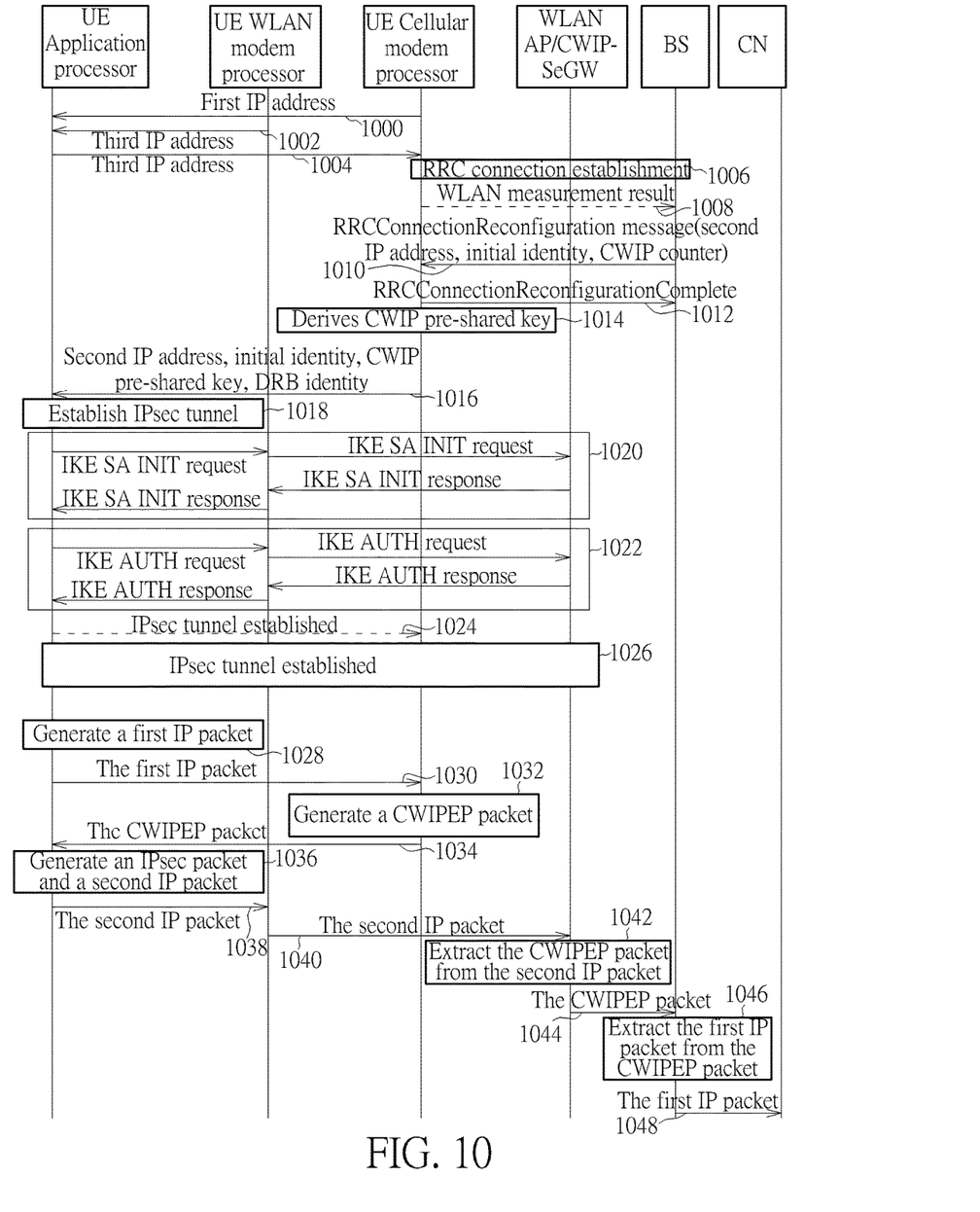
FIG. 10 is a flow diagram of an establishment of an IPsec tunnel for a CWIP according to an example of the present invention.

FIG. 10 is a flow diagram of an establishment of an IPsec tunnel for a CWIP according to an example of the present invention. Steps 1000-1014 are same as steps 900-914. Steps 1016-1026 are same as steps 814-824. In step 1028, the application processor generates a first IP packet. In step 1030, the application processor transmits the first IP packet to the cellular modem processor. In step 1032, the cellular modem processor generates a CWIPEP packet including the first IP packet. In step 1034, the cellular modem processor transmits the CWIPEP packet to the application processor. In step 1036, the application processor generates an IPsec packet including the CWIPEP packet, and generates a second IP packet including the IPsec packet Steps 1038-1048 are same as steps 828-838.

Figure 11:
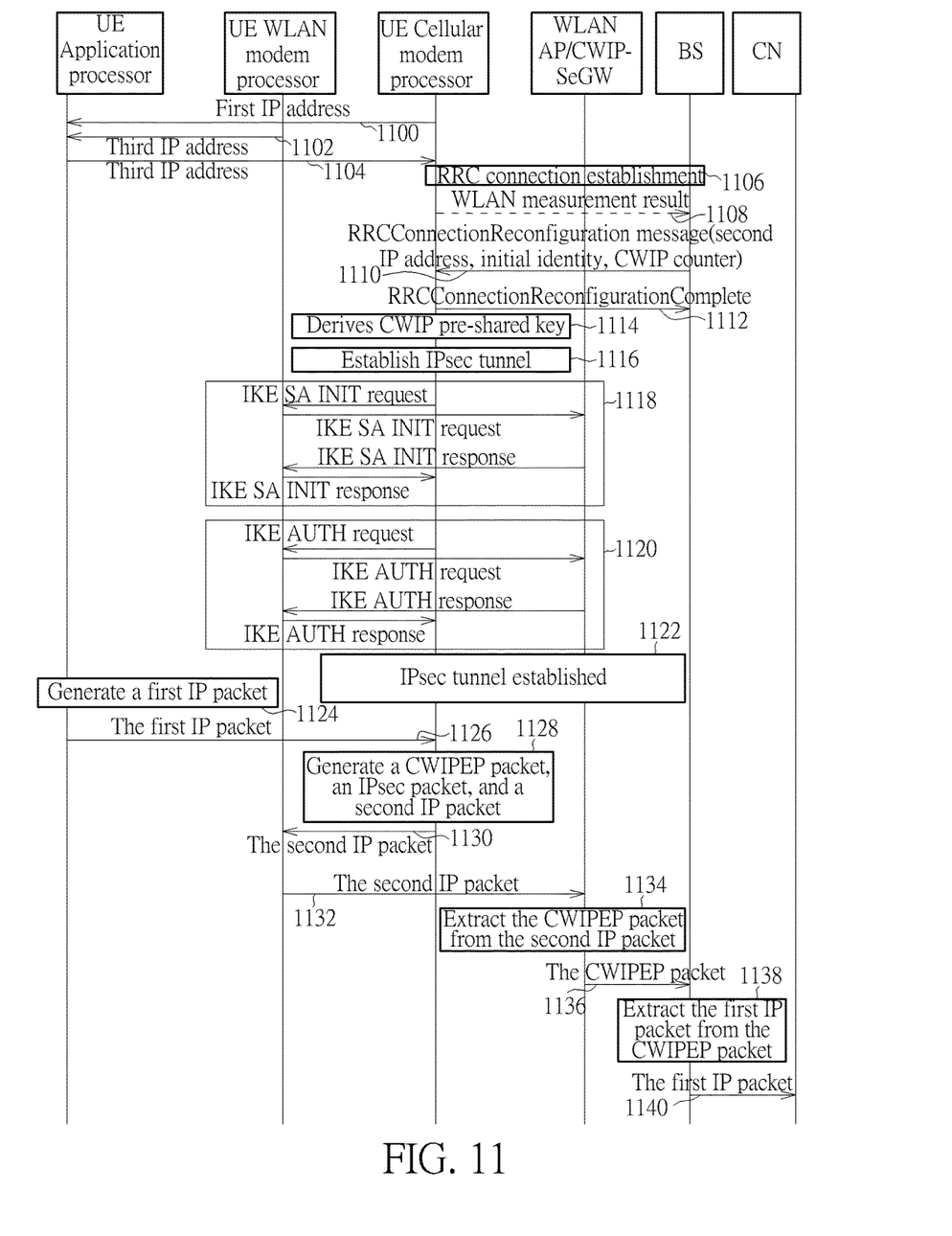
FIG. 11 is a flow diagram of an establishment of an IPsec tunnel for a CWIP according to an example of the present invention.

FIG. 11 is a flow diagram of an establishment of an IPsec tunnel for a CWIP according to an example of the present invention. Steps 1100-1116 are same as steps 900-916. In step 1118, an IKE SA INIT procedure is performed between the WLAN modem processor, the cellular modem processor and a CWIP-SeGW. In detail, the cellular modem processor transmits an IKE SA INIT request via the WLAN modem processor to the CWIP-SeGW via the WLAN AP. The CWIP-SeGW transmits an IKE SA INIT response to the WLAN modem processor. Then the WLAN modem processor transmits the IKE SA INIT response to the cellular modem processor. In step 1120, an IKE authentic procedure is performed between the WLAN modem processor, the cellular modem processor and the CWIP-SeGW. In detail, the cellular modem processor transmits an IKE AUTH request via the WLAN modem processor to the CWIP-SeGW via the WLAN AP. The CWIP-SeGW transmits an IKE AUTH response to the WLAN modem processor. Then the WLAN modem processor transmits the IKE AUTH response to the cellular modem processor. Steps 1122-1126 are same as steps 922-926. In step 1128, the cellular modem processor generates a CWIPEP packet including the first IP packet, generates an IPsec packet including the CWIPEP packet, and generates a second IP packet including the IPsec packet. In step 1130, the cellular modem processor transmits the second IP packet to the WLAN modem processor. Steps 1132-1140 are same as steps 830-838.

In above processes and examples, the "cellular" may be replaced by "LTE" or "5G/NR", the "CWIP" may be replaced by "LWIP" or "5GWIP", and the "CWIPEP" packet may be replaced by the "LWIPEP" or "5GWIPEP" packet.

The abovementioned description, steps and/or processes including suggested steps can be realized by means that could be hardware, software, firmware, an electronic system, or combination thereof. An example of the means be the communication device 20. Any of the abovementioned processes may be compiled into the program code 214.

To sum up, the present invention provides a method and related communication device for handling the CWIP. Accordingly, the UE knows how to communicate IP packets with the BS via the WLAN, when being configured with the CWIP.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling a Cellular Network and Wireless Local Area Network (WLAN) Radio Level Integration with Internet Protocol Security (IPsec) Tunnel (CWIP), comprising:
   a storage device; and
   a processing circuit, coupled to the storage device, wherein the storage device stores instructions, and the processing circuit is configured to execute the instructions of:
   having a cellular connection with a base station (BS) of a cellular network;
   receiving a first Internet Protocol (IP) address from the BS via the cellular connection;
   receiving a CWIP configuration configuring a second IP address from the BS, wherein the second IP address is for establishing a first IPsec tunnel for the CWIP;
   having a WLAN connection with an access point (AP) of a WLAN, and receiving a third IP address from the AP of the WLAN via the WLAN connection, wherein the third IP address is for transmitting at least one IP packet via the AP of the WLAN;
   establishing the first IPsec tunnel to the second IP address via the WLAN connection by using the third IP address, when having the cellular connection;
   generating a first IP packet of the at least one IP packet and setting a source IP address of the first IP packet to the first IP address; and
   transmitting the first IP packet to the BS via the first IPsec tunnel, when having the cellular connection.

2. The communication device of claim 1, wherein the cellular connection is processed by a cellular modem processor of the communication device, the first IP address is received by the cellular modem processor, and the instructions further comprise:
   the cellular modem processor transmitting the first IP address to an application processor of the communication device.

3. The communication device of claim 2, wherein the CWIP configuration is received by the cellular modem processor, and the instructions further comprise:
   the cellular modem processor transmitting the CWIP configuration to the application processor.

4. The communication device of claim 3, wherein the WLAN connection is processed by a WLAN modem processor of the communication device, the third IP address is received by the WLAN modem processor, and the instructions further comprise:
   the WLAN modem processor transmitting the third IP address to the application processor.

5. The communication device of claim 4, wherein the first IPsec tunnel is established by the application processor, the first IP packet is generated by the application processor, the first IP address is set by the application processor, and the first IP packet is transmitted to the BS by the application processor.

6. The communication device of claim 4, wherein the third IP address is transmitted to the cellular modem processor by the application processor, and the first IPsec tunnel is established by the cellular modem processor.

7. The communication device of claim 6, wherein the first IP packet is generated by the application processor, the first IP address is set by the application processor, and the instructions further comprise:

the application processor transmitting the first IP packet to the cellular modem processor, and the first IP packet is transmitted to the BS by the cellular modem processor via the first IPsec tunnel.

8. The communication device of claim 1, wherein the instruction of transmitting the first IP packet to the BS via the first IPsec tunnel further comprising:

encapsulating the first IP packet to a second IP packet;
setting a source IP address of the second IP packet to the third IP address; and
setting a destination IP address of the second IP packet to the second IP address.

9. The communication device of claim 1, wherein the instructions further comprise:

establishing a second IPsec tunnel to a fourth IP address of an evolved packet data gateway (EPDG) via the WLAN connection by using the third IP address, when having the first IPsec tunnel;
routing a second packet to the first IPsec tunnel, when the second packet does not include an IP Multimedia Subsystem (IMS) signaling packet and an IMS data packet; and
routing the second packet to the second IPsec tunnel, when the second packet includes the IMS signaling packet or the IMS data packet.

10. A method of handling a Cellular Network and Wireless Local Area Network (WLAN) Radio Level Integration with Internet Protocol Security (IPsec) Tunnel (CWIP) for a communication device, the method comprising:

having a cellular connection with a base station (BS) of a cellular network;
receiving a first Internet Protocol (IP) address from the BS via the cellular connection;
receiving a CWIP configuration configuring a second IP address from the BS, wherein the second IP address is for establishing a first IPsec tunnel for the CWIP;
having a WLAN connection with an access point (AP) of a WLAN, and receiving a third IP address from the AP of the WLAN via the WLAN connection, wherein the third IP address is for transmitting at least one IP packet via the AP of the WLAN;
establishing the first IPsec tunnel to the second IP address via the WLAN connection by using the third IP address, when having the cellular connection;
generating a first IP packet of the at least one IP packet and setting a source IP address of the first IP packet to the first IP address; and
transmitting the first IP packet to the BS via the first IPsec tunnel, when having the cellular connection.

11. The method of claim 10, wherein the cellular connection is processed by a cellular modem processor of the communication device, the first IP address is received by the cellular modem processor, and the method further comprising:

the cellular modem processor transmitting the first IP address to an application processor of the communication device.

12. The method of claim 11, wherein the CWIP configuration is received by the cellular modem processor, and the method further comprising:

the cellular modem processor transmitting the CWIP configuration to the application processor.

13. The method of claim 12, wherein the WLAN connection is processed by a WLAN modem processor of the communication device, the third IP address is received by the WLAN modem processor, and the method further comprising:

the WLAN modem processor transmitting the third IP address to the application processor.

14. The method of claim 13, wherein the first IPsec tunnel is established by the application processor, the first IP packet is generated by the application processor, the first IP address is set by the application processor, and the first IP packet is transmitted to the BS by the application processor.

15. The method of claim 13, wherein the third IP address is transmitted to the cellular modem processor by the application processor, and the first IPsec tunnel is established by the cellular modem processor.

16. The method of claim 15, wherein the first IP packet is generated by the application processor, the first IP address is set by the application processor, and the method further comprising:

the application processor transmitting the first IP packet to the cellular modem processor, and the first IP packet is transmitted to the BS by the cellular modem processor via the first IPsec tunnel.

17. The method of claim 10, wherein the step of transmitting the first IP packet to the BS via the first IPsec tunnel comprising:

encapsulating the first IP packet to a second IP packet;
setting a source IP address of the second IP packet to the third IP address; and
setting a destination IP address of the second IP packet to the second IP address.

18. The method of claim 10, further comprising:

establishing a second IPsec tunnel to a fourth IP address of an evolved packet data gateway (EPDG) via the WLAN connection by using the third IP address, when having the first IPsec tunnel;
routing a second packet to the first IPsec tunnel, when the second packet does not include an IP Multimedia Subsystem (IMS) signaling packet and an IMS data packet; and
routing the second packet to the second IPsec tunnel, when the second packet includes the IMS signaling packet or the IMS data packet.

* * * * *